April 17, 1962     G. S. SMELTZER     3,030,550
ELECTRICAL APPARATUS
Filed June 28, 1960

INVENTOR
George S. Smeltzer
BY
F. E. Browder
ATTORNEY

United States Patent Office 3,030,550
Patented Apr. 17, 1962

3,030,550
ELECTRICAL APPARATUS
George S. Smeltzer, Forest Hills, Pa., assignor to Westinghouse Electric Corporation, East Pittsburgh, Pa., a corporation of Pennsylvania
Filed June 28, 1960, Ser. No. 39,284
6 Claims. (Cl. 315—203)

This invention relates to electrical apparatus, more particularly to electrical apparatus for providing pulses of electrical energy, which pulses may be used in any application where a pulse of electrical energy is desired such as firing of lamps or the firing of ignitron tubes.

It is an object of my invention to provide an improved pulse producing circuit.

It has been the practice in the prior art to provide pulse producing circuits for providing the necessary pulses of electrical energy for firing lamps and ignitron tubes and the like by charging a condenser through the secondary winding of a charging transformer which is connected in series with a charging impedance and a rectifier. After the condenser is charged to a predetermined value, the condenser is caused to discharge through the utilization circuit such as a lamp, or the ignitor-cathode circuit of an ignitron tube. The current which passes through the utilization circuit is then returned to the condenser through the secondary of the charging transformer, the charging impedance and the rectifier. Since the impedance of the circuit comprising the secondary of the charging transformer, the charging impedance and the charging rectifier is usually fairly high most of the energy of the firing pulse is lost in this circuit and very little of it is available for re-charging the condenser in the predetermined direction for providing the next firing pulse.

It is accordingly, the main object of this invention to provide an improved pulse providing circuit wherein the current of a preceding pulse is returned to the energy storage device through a circuit which has less impedance than the charging circuit whereby very little of the energy is lost in the return circuit due to the impedance of the return circuit and most of it is available for re-charging the condenser in the predetermined direction for providing the next firing pulse.

It is another object of this invention to provide an improved pulse providing circuit comprising an energy storage device and a charging circuit for charging said energy storage device to a predetermined value and a circuit for discharging said condenser through a pulse utilization means and another circuit for returning the current from said pulse utilization means to said energy storage device to re-charge said energy storage device in said predetermined direction.

These and other objects are affected by this invention as will be apparent from the following description taken in accordance with the accompanying drawings, forming a part of this application, in which.

Figure 1:
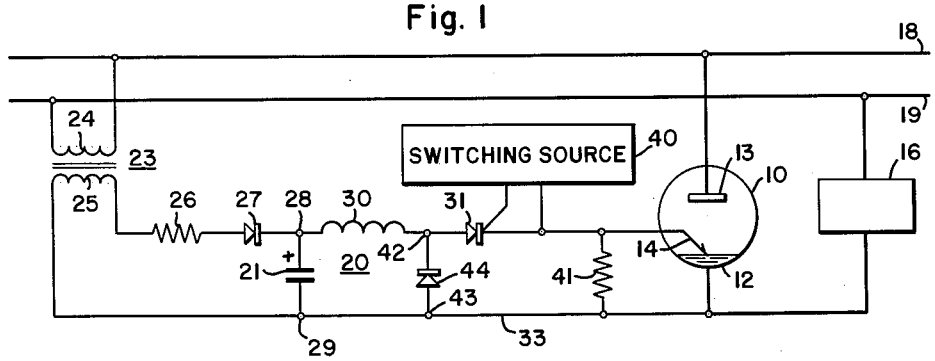
FIGURE 1 is a schematic diagram of my improved pulse providing circuit showing the circuit connected to the ignitor-cathode circuit of a single ignitron tube.

Referring to the drawings in detail, in FIGURE 1, I use a single ignitron tube 10 for the purpose of illustrating my invention. This ignitron tube has a mercury pool type cathode 12, an anode 13, and an ignitor 14. This ignitron tube 10 is connected in series with a unidirectional-current load 16, across an alternating current energy circuit comprising conductors 18 and 19.

The alternating current energy circuit is illustrated, for purposes of simplicity as being a single phase circuit. It is well known that there are many other possible connections in which ignitron tubes may be used, and my novel pulse providing circuit, in general, is applicable to all of them.

When the ignitron tube 10 is used as a simple rectifier, as shown in FIGURE 1, it requires its ignitor-cathode circuit to receive energizing pulses which are properly timed with respect to the phase of the alternating cycle of the supply energy, so as to start the conducting periods of the tube at the proper times.

In order to supply the proper energizing pulses for the ignitor-cathode circuit, I utilize a circuit which is indicated generally in FIGURE 1 by the reference numeral 20. The circuit 20 comprises an energy device, illustrated in this instance as condenser 21. The condenser 21 is charged to a predetermined value in the direction as indicated by the plus (+) sign in FIGURE 1 through a charging circuit which comprises a transformer 23. The transformer 23 has a primary winding 24 which is connected to the alternating current source conductors 18 and 19 and a secondary winding 25. It is seen from FIGURE 1 that the secondary winding 25 of the transformer 23 is connected in series circuit relationship with a charging resistor 26, a diode 27, and the condenser 21. The diode 27 is poled to charge the condenser 21 to a predetermined value in the direction indicated by the plus mark in FIGURE 1. The condenser 21 is connected through a pulse shaping inductance 30, a switching means 31, in series circuit relationship with the ignitor 14-cathode 12 of the ignitron 10. The cathode 12 of the ignitron is connected back to the terminal 29 of the condenser 21 through conductor 33.

The semiconductor device 31 may be a controlled rectifier or any other three element semiconductor device which may be switched to a conducting state or a non-conducting state. The device 31 may be switched to its conducting state by some suitable switching source, which has been indicated generally at 40. It is also understood that any suitable switching device such as a thyratron or other device may be substituted for the semiconductor switching device 31. The switching source 40 is a timed switching source which may be a conventional sawtooth generator and it serves to switch the device 31 on in proper timed relationship with respect to the phase of the alternating current of the supply energy at the proper time to cause the condenser 21 to discharge through the ignitor 14-cathode 12 circuit of the ignitron. Switching sources such as 40 are conventional in the art. The device 31 is switched to its non-conducting state when the total current through the ignitor 14-cathode 12 becomes zero. A resistor 41 is connected across the ignitor 14-cathode 12 circuit. A semiconductor rectifier is connected across the condenser 21 at terminals 42 and 43. It is seen that the rectifier 44 is poled in the opposite direction to the charging rectifier 27.

Figure 2:
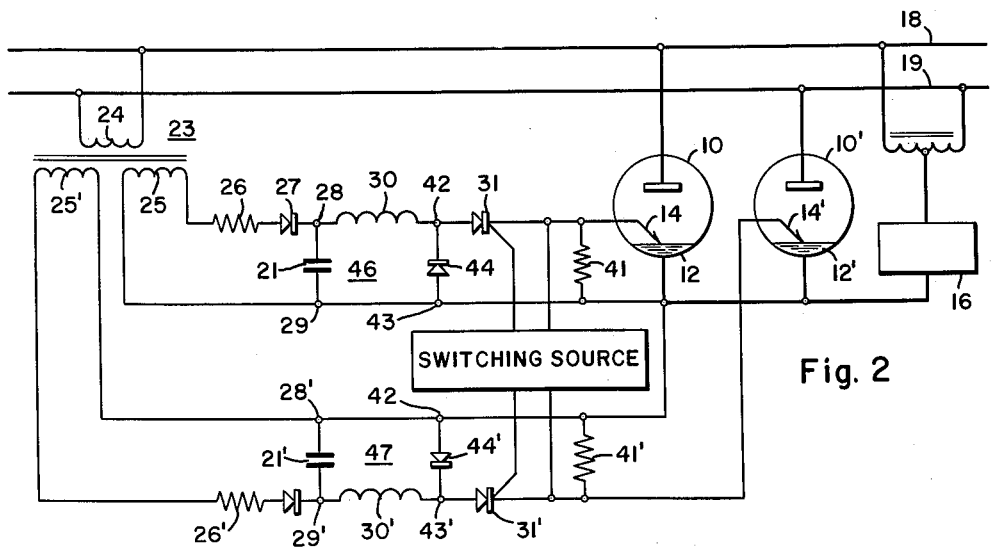
FIGURE 2 is a schematic diagram showing two of my improved pulse providing circuits connected to the ignitor-cathode circuits of two ignitron tubes.

In FIGURE 2 I have illustrated how two of my improved pulse providing circuits 46 and 47 may be utilized to provide firing pulses for two ignitron tubes 10 and 10′ which supply unidirectional current to a common load 16. The upper firing circuit 46 has been given the same reference numerals as the firing circuit 20 illustrated in FIGURE 1. The lower firing circuit 47 has been given the same reference numerals as the firing circuit 20 in FIGURE 1 with primes added. The circuits of FIGURE 2 operate identically to the circuit illustrated in FIGURE 1 and have been shown merely for the purpose of illustrating how my improved firing circuit may be connected in a circuit to provide pulses for a plurality of load devices.

The pulse producing circuit of FIGURE 1 operates in the following manner. The condenser 21 is charged to a predetermined value from the alternating current supply lines 18 and 19 through the secondary winding 25 of the transformer 23, the charging resistance 26, and the rectifier 27. During the charging of the condenser 21 to the predetermined value the switching device 31 is in its non-conducting or open state. After the condenser 21 has been charged to its predetermined value in the positive direction as indicated by the plus mark in FIGURE 1, the switching source 40 applies a switching potential to the semiconductor device 31 to switch the device 31 to its conducting or on state. The condenser 21 then discharges through the pulse shaping inductance 30, the switching device 31, the ignitor 14-cathode 12 circuit, the conductor 33 and the current builds up a charge on the plate of the condenser 21 nearest the terminal 29. During the conduction of the ignitron 10 a direct current voltage is supplied to the load 16. When the total current through the ignitor 14-cathode 12 becomes zero, then the charge which has been building up on the plate of the condenser near the terminal 29 ceases to build up any further. In the prior art devices when the total current in the ignitor 14-cathode 12 circuit becomes zero, the plate of the condenser nearest the terminal 29 would then discharge through the secondary 25 of the transformer, the charging resistance 26 and the diode 27 to begin re-charging of the condenser 21 to the predetermined value in the direction indicated by the plus mark on FIGURE 1. However, in the present circuit this action does not take place, since the diode 44 shunts the charging circuit comprising the secondary 25 of the transformer 23, the charging resistor 26 and the diode 27. The diode 44 has much less impedance in its conducting direction than the charging circuit. Therefore, as soon as the total current in the ignitor 14-cathode 12 circuit becomes zero, the plate of the condenser nearest the terminal 29, which has been building up a positive charge, then discharges this positive charge through the diode 44 and the pulse shaping inductance 30 back to the plate of the condenser nearest the terminal 28 and starts building up the positive charge on the condenser in the direction necessary to provide the next pulse for firing the ignitron. Since the impedance of the diode 44 is very low compared to the impedance of the secondary 25 of the transformer 23, the charging resistance 26, and the diode 27 very little of the energy used to provide the preceding pulse for the ingitor 14-cathode 12 circuit is lost in the impedance of the diode 44 and most of it is returned to the plate of the condenser adjacent the terminal 28 to build up the charge on the condenser 21 in the direction to provide the next pulse. Consequently, it is only necessary for the charging circuit comprising the transformer 23 to provide the additional energy, which is lost in the ignitor 14-cathode 12 circuit to build up the positive charge on the condenser 21 to the predetermined magnitude in the proper direction on the plate of the condenser adjacent the terminal 28 to provide the next pulse. This additional energy which must be provided by the charging circuit is very small compared to what it would be if the current returning from the ignitor 14-cathode 12 circuit is returned through the charging circuit, since most of it would be lost due to the impedance of the charging circuit. Thus it would be necessary for the charging circuit to supply almost all of the energy necessary to build up the charge on the condenser 21 to the predetermined magnitude in the proper direction. The diode 44 being of much less impedance than the charging circuit conserves this energy and uses it to rebuild the charge on the condenser 21 in the proper direction so that it may be reused for the next pulse.

The rectifier 27 is poled in such a direction as to prevent the capacitor 21 from discharging back through the charging circuit comprising the secondary 25 of the transformer 23 and the charging resistance 26 before the ignitor 14-cathode 12 circuit fires. It is general practice in the ignitron art to fire the ignitor 14-cathode 12 circuit from about 30° before the end of the positive alternation to approximately 30° before the end of the negative alternation of the voltage delivered by the secondary 25 of the transformer 23. This is done to prevent follow-up current from the supply line passing directly through the ignitor 14-cathode 12 circuit. The resistor 41 which shunts the ignitor 14-cathode 12 circuit and also shunts the capacitor 21 is a stabilizing resistor and enables the capacitor 21 to discharge in case the ignitor 14 misfires. The width of the pulse applied by the capacitor 21 to the ignitor 14 is determined mainly by the characteristics of the inductance 30 and the value of the capacitor 21.

When the capacitor 21 is being charged to its predetermined value in the positive direction as indicated on FIGURE 1, the rectifier 44 blocks current flow because of the direction in which it is poled. During the time in which the ignitor 14 is firing the drop across the ignitor 14-cathode 12 creates an inverse voltage on the rectifier 44 so that there is no current flow through it in the conducting direction. When the current in the ignitor 14-cathode 12 circuit drops to zero this puts the voltage of the condenser across the rectifier 44 in its conducting direction and the capacitor 21 discharges back through the rectifier 44 and the inductance 30 to recharge the capacitor 21 in the direction to rebuild the charge on the capacitor 21 to its predetermined value in the positive direction. The impedance of the rectifier 44 and the inductance is very small. Consequently, very little power is lost in this circuit.

Figure 3:
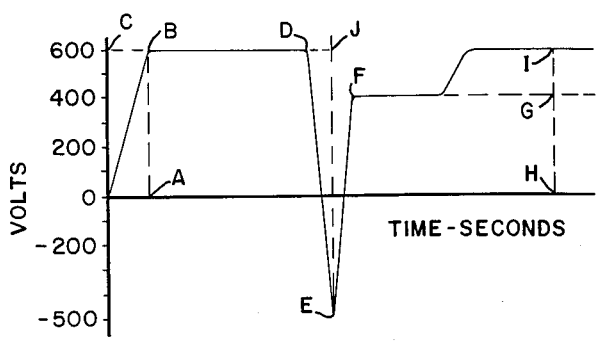
FIGURE 3 is a graph illustrating the voltage waveforms of the circuit of FIGURE 1.

Referring to FIGURE 3 which represents the voltage wave forms of the circuit of FIGURE 1. The line A—B represents the predetermined voltage to which the condenser 21 is initially charged in the positive direction, which as illustrated is approximately 600 volts. The line C—B represents the charging time. At point D, when the switching device 31 is switched to its conducting state, the condenser 21 discharges along line D—E. At point E the current through the ignitor 14-cathode 12 circuit becomes zero, then the condenser 21 again discharges along the line E—F to begin the recharge of the condenser in the positive direction to provide the next pulse. This return of energy from the ignitor 14-cathode 12 circuit, through the diode 44 and inductance 30 is sufficient to recharge the condenser 21 to about 400 volts. This voltage is represented by the line G—H. The line G—I represents the voltage which must be added to the condenser 21 from the transformer 23 in order to bring the charge of the condenser 21 back up to its predetermined value of 600 volts to ready the condenser 21 for providing the next pulse. As seen from the graph the transformer 23 must add approximately 200 volts for each pulse after the first pulse. The line D—J represents the width of the pulse applied to the ignitor 14-cathode 12. In this illustration the pulse width is approximately 15 degrees.

The pulse providing circuit illustrated in FIGURE 1 has many advantages over the prior art pulse providing circuits. My circuit requires smaller size current limiting impedance for the charging circuits, smaller size transformers for the charging circuit, requires less current drawn from the power line and decreases the total power loss of the circuit. These advantages all add up to make my circuit a much more efficient and desirable firing circuit than the prior art circuits.

Each of the firing circuits 46 and 47 illustrated in FIGURE 2 operate in the same manner as the firing circuit 20 in FIGURE 1.

Satisfactory pulse providing circuits have been built and tested according to the schematic diagram of FIGURE 1, using the following values for the components:

(1) Voltage across secondary 25 of transformer 23, −426 volts.
(2) R26, −100 ohms.
(3) Condenser 21, $22 \times 10^{-6}$ farads.
(4) Inductance L, $2.2 \times 10^{-3}$ henries.
(5) Resistance 41, −20 ohms.
(6) Voltage across condenser 21, −600 peak positive volts.

Although I have shown and described my improved pulse providing circuit in connection with an ignitron type tube having a mercury pool cathode and an ignitor electrode, it is understood however, that my improved circuit may be used in any application where it is desired or required to use a pulse of electrical energy.

While I have shown my invention in several forms, it will be obvious to those skilled in the art that it is not so limited, but is susceptible of various changes and modifications without departing from the spirit thereof.

I claim as my invention:

1. In a pulse producing circuit, energy storage means, first circuit means comprising impedance for charging said energy storage means in a predetermined direction, means for discharging said energy storage means through pulse utilization means, impedance means providing a circuit in parallel with said pulse utilization means, and second circuit means having lower impedance than said circuit means for charging said energy storage means for returning current from said pulse utilization means back to said energy storage means to recharge said energy storage means in said predetermined direction.

2. In a pulse producing circuit, energy storage means, first circuit means comprising impedance for changing said energy storage means in a predetermined direction, means for causing said energy storage means to discharge through pulse utilization means, impedance means providing a circuit in parallel with said pulse utilization means, and second circuit means comprising unidirectional current conducting means having lower impedance in the cutrrent conducting direction than said circuit means for charging said energy storage means for returning current from said pulse utilization means back to said energy storage means to recharge said energy storage means in said predetermined direction.

3. In a pulse producing circuit, energy storage means, first circuit means comprising impedance for charging said energy stortage means in a predetermined direction, means for discharging said energy storage means through pulse utilization means, resistor means providing a circuit in parallel with said pulse utilization means, and a rectifier connected in shunt circuit relationship with said circuit means for charging said energy storage means for providing a path for return of current from said pulse utilization means to recharge said energy storage means in said predetermined direction, said rectifier being poled so as to present less impedance to current returning from said pulse utilization means to said energy storage means than the impedance presented by said circuit for charging said energy storage means.

4. In a circuit for firing an ignitron tube comprising a cathode and an ignitor, energy storage means, means for charging said energy storage means comprising a first diode poled to charge said energy storage means in a predetermined direction, first circuit means connecting said energy storage means in series circuit relationship with said ignitor and cathode, second circuit means providing a circuit parallel to said ignitor-cathode circuit, said first circuit means comprising switching means for causing said energy storage means to discharge through said ignitor-cathode circuit, and third circuit means comprising a second diode poled opposite to said first diode for returning current from said ignitor-cathode circuit to said energy storage means to recharge said energy storage means in said predetermined direction.

5. In a circuit for firing an ignitron tube, comprising a cathode and an ignitor, said tube energy storage means comprising a capacitor, means for charging said energy storage means comprising a first diode poled to charge said energy storage means in a predetermined direction, first circuit means connecting said energy storage means in series circuit relationship with said ignitor and cathode, second circuit means providing a circuit parallel to said ignitor-cathode circuit, said first circuit means comprising semi-conductor switching means for causing said energy storage means to discharge through said ignitor-cathode circuit, and third circuit means comprising a second diode poled opposite to said first diode for returning current from said ignitor-cathode circuit to said storage means to recharge said energy storage means in said predetermined direction.

6. In a circuit for firing an ignitron tube, said tube comprising a cathode and an ignitor, energy storage means comprising a capacitor, means for charging said capacitor comprising a serially connected resistor and a first diode connected to said capacitor, means for supplying power to said means for charging said capacitor, said first diode being poled to charge said capacitor in a predetermined direction, means comprising an inductor and semi-conductor switching means connecting said capacitor in series relationship with said ignitor-cathode, said semi-conductor switching means being effective in one state to cause said capacitor to apply a pulse to said ignitor-cathode, circuit means providing a circuit parallel to said ignitor-cathode circuit, and a second circuit means comprising a second diode poled opposite to said first diode for returning current from said ignitor-cathode circuit to said capacitor to recharge said capacitor in said predetermined direction.

References Cited in the file of this patent

UNITED STATES PATENTS

| | | |
|---|---|---|
| 2,465,097 | Herskind et al. | Mar. 22, 1949 |
| 2,907,929 | Lawson | Oct. 6, 1959 |